United States Patent [19]

Groves

[11] 4,030,972

[45] June 21, 1977

[54] FLUIDLY DRIVEN CONTROL ROD

[75] Inventor: Malcolm Duane Groves, Suffield, Conn.

[73] Assignee: Combustion Engineering, Inc., Windsor, Conn.

[22] Filed: Apr. 22, 1974

[21] Appl. No.: 463,011

[52] U.S. Cl. .................................. 176/36 R; 91/49; 91/224; 91/417 R

[51] Int. Cl.² .......................................... G21C 7/08

[58] Field of Search .............. 176/36 R, 36 C, 36 S, 176/44, 86; 91/49, 224, 417 R; 92/181 R, 181 P

[56] References Cited

UNITED STATES PATENTS

| | | | |
|---|---|---|---|
| 2,161,922 | 6/1939 | Goode | 91/49 |
| 2,855,899 | 10/1958 | Beaty | 176/36 R |
| 3,154,472 | 10/1964 | Shannon | 176/36 R |

Primary Examiner—Samuel Feinberg
Attorney, Agent, or Firm—Richard H. Berneike; Joseph H. Born

[57] ABSTRACT

A fluid driven actuator for a neutron absorber in a nuclear reactor is of the piston and cylinder type. The actuator is located above the reactor core. Means are provided for alternately opening and closing a by-pass fluid flow path or passage through or across the piston within the cylinder. The flow path is closed when the piston and control rod is being raised and is subsequently opened to reduce flow resistance during insertion or scram. In the preferred embodiment, the piston is longitudinally movable relative to the piston or extension rod which connects with the neutron absorber. In one position of the piston, the by-pass path is open and in another position, it it closed.

9 Claims, 5 Drawing Figures

FLUIDLY DRIVEN CONTROL ROD

BACKGROUND OF THE INVENTION

The present invention relates to control means for nuclear reactors. More specifically the invention is directed to actuating means for neutron absorbing control rods. More specifically still the invention is directed to fluidly actuated control rods, particularly of the shutdown type.

In the nuclear reactor the fission process is controlled or regulated by regulating the amount of neutron absorbing material in the core region of the reactor. The most common form of such neutron absorbing material is that of elongated solid control rods which may be inserted into or withdrawn from the core region of the reactor. A variety of control rod configurations and modes of operation have evolved in the control of nuclear reactors. However, all tend to have one requirement in common and that is that all or most of the control rods be capable of rapid insertion into the core in the event it is desired to rapidly attenuate the fission process.

Control rods may be positioned either at continuous incremental positions between a fully withdrawn and a fully inserted position or at only the fully inserted and fully withdrawn positions. Further, a variety of actuating means have been developd for the movement of the control rod. Rack and pinion and magnetic jack actuators have been applied extensively to the continuous or incremental positioning of control rods. On the other hand, fluid actuators have generally been utilized for the two position only control mode.

In some fluid-driven control rod actuators a liquid, such as the reactor coolant, is utilized to drive a piston to withdraw a top actuated control rod from the reactor core. Typically, the pistons on such hydraulically driven control rods have been loose fitting within the actuator cylinder in order to allow for relatively rapid scramming of the control rod. A loose fitting piston permits relatively free flow of the liquid therepast when it is in a free fall condition, as during a scram. However, such an arrangement requires a high fluid flow rate just to maintain a control rod in equilibrium and an even greater flow to raise the rod. Because of the high flow rate required, it has been difficult to control the speed with which the control rod is raised and control rod withdrawal may occur too rapidly. Further, large hydraulic components and high pumping power are required for the high flow rates.

SUMMARY OF THE INVENTION

The present invention overcomes the above briefly discussed disadvantages of the prior art by providing a novel actuator for a neutron absorber. The neutron absorber actuator of the present invention is of the piston and cylinder type and uses a fluid, such as the reactor coolant to provide the piston driving force. The invention is particularly applicable to control rods of the two piston type and particularly those in which a control rod remains withdrawn during normal reactor operation and is rapidly inserted to effect shutdown when such is necessary; however, the invention is similarly applicable to incrementally positionable control rods which utilize a fluid actuator.

According to the invention, an extension or piston rod extends upward from the neutron absorber and includes a piston therewith, the combination acting within the cylinder to provide a drive means for the neutron absorber which may alternately open and close a flow path within the cylinder across the piston. The opening and closing of the flow path serves to vary the flow resistance across the piston and piston rod to permit a relatively low flow rate to raise the assembly when the path is closed and to allow low resistance flow across the piston for a rapid scram when it is open. Preferably, the flow path is created by allowing the piston to move longitudinally of the control rod into and out of sealing contact with a head portion of the rod. The piston is freely disposed about the rod.

Also in accordance with the invention a source of fluid is operatively connected to the actuator cylinder for selectively applying an upward flow of fluid therein sufficient to raise the piston, the extension rod and the neutron absorber.

Further in accordance with the present invention the piston and a head portion of the piston rod near its upper end are designed to be in a fluid sealing relationship with each other when the above noted neutron absorber raising force is applied to the piston.

Also in accordance with the invention means are provided for latching the piston rod in the fully raised, or withdrawn, position and the piston may move downwardly relative thereto to create a fluid passageway therebetween when the lifting force is removed from the piston.

In one embodiment of the invention the piston may be permitted only limited longitudinal movement relative to the piston rod; whereas in another embodiment the piston may be permitted to move relatively the full length of the piston rod.

BRIEF DESCRIPTION OF THE DRAWINGS

The present invention may be better understood and its numerous objects and advantages will become apparent to those skilled in the art by the reference to the accompanying drawing wherein like reference numerals refer to like elements in the several figures and in which.

DESCRIPTION OF THE PREFERRED EMBODIMENTS

Figure 1:
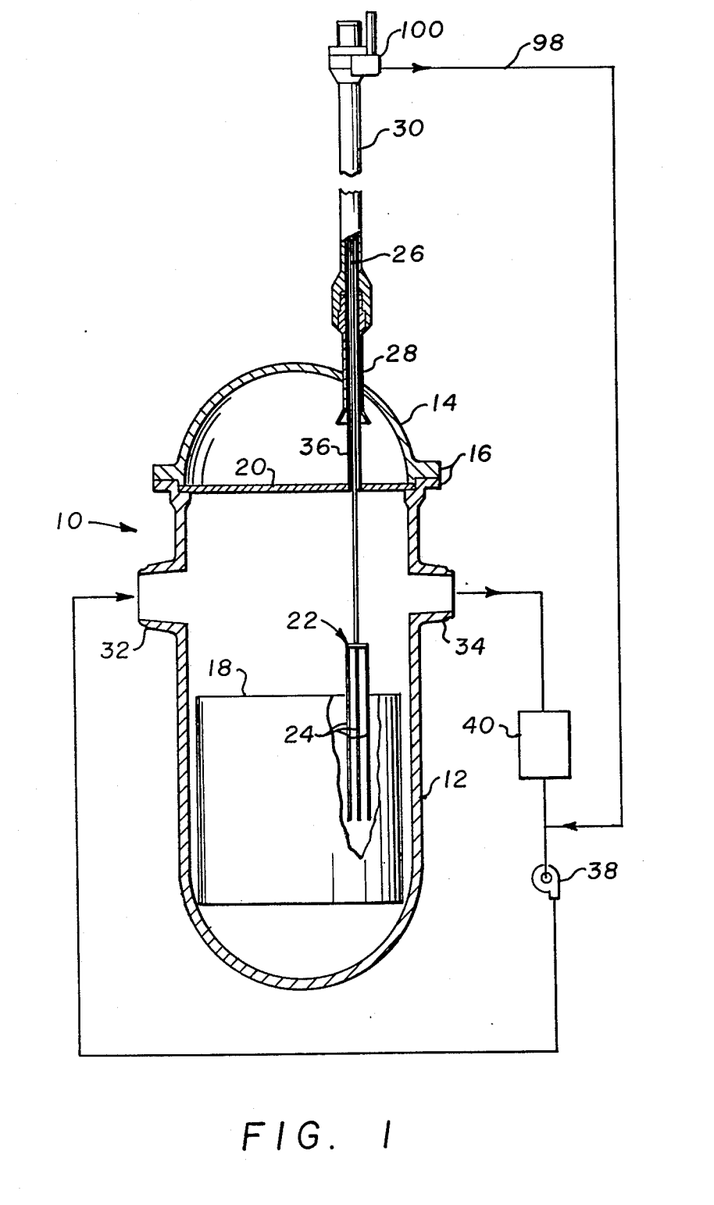
FIG. 1 is a schematic view of a fluidly actuated, top mounted reactor control system in accordance with the present invention.

Referring to FIG. 1, the pressure vessel of a pressurized water reactor is indicated generally at 10 and comprises a certically oriented cylinderical shell 12 closed at its lower end and including a closed or upper head portion 14, each of which meet at flanges 16. A fuel containing core 18 of the reactor is located in the lower portion of vessel 10. A support member 20 is removably supported in and by vessel 10 at or near flanges 16.

Control rod assemblies 22, only one of which is shown here for brevity, are positioned for downward insertion into core 18 to control the fission process and accordingly, the power level of the reactor. A typical reactor may include a large number of control rod assemblies 22. Each control rod assembly 22 may include one or more rod-like neutron absorber elements 24. An extension rod or shaft 26 extends upwardly from the absorber elements 24 through an opening in the support member 20 and through an aligned opening in head 14. Extension shaft 26 serves to connect the neutron absorber elements 24 with the control rod actuator and in fact, according to the present invention, may define part of the actuator.

The actuator for each control rod 22 is housed within a pressure housing which extends upwardly from reactor vessel 10 and includes a nozzle 28 through head 14 extending upwardly and weldingly joined and sealed thereto and actuator housing tube 30 joined at its lower end with the upper end of nozzle 28, as by a weld. Nozzle 18 is open at both ends and actuator housing 30 at its lower end to receive the control rod extension shaft 26 therewithin.

An inlet 32 is provided for the flow of coolant into the reactor and an outlet 34 permits coolant flow out of the reactor. Typically the coolant is a liquid such as water. A piston stop support tube 36, to be described below, is hollow and open at both ends and supportedly joined at its lower end with support member 20 in vertical registry with an opening through said support member. Various other openings, not shown here, extend vertically through support member 20 to permit the coolant to occupy the region within head 14.

A pump or pumps, generally represented at 38, are associated with the reactor for continuously circulating coolant fluid through the reactor. A heat exchange device or devices, generally represented at 40, is also associated with the reactor to extract heat from the coolant for conversion to use for work. The principal function of pumps 38 is to circulate the coolant into the reactor through inlet 32, through the core 18, out the reactor through outlet 34, through heat exchanger 40 and back to the inlet through the pump. Useful energy, in the form of heat generated by the fission process, is absorbed by the coolant as it circulates through the core 18 and given up as it circulates through the heat exchanger 40. In the present invention, as well as in certain prior art fluid actuated control rod drive systems, an additional flow path for the coolant is provided between the interior of the reactor vessel 10 and the low pressure or intake side of pump 38. This additional fluid circuit includes the control rod drive actuator in series therewith in a manner to be described hereinbelow.

Figure 2:
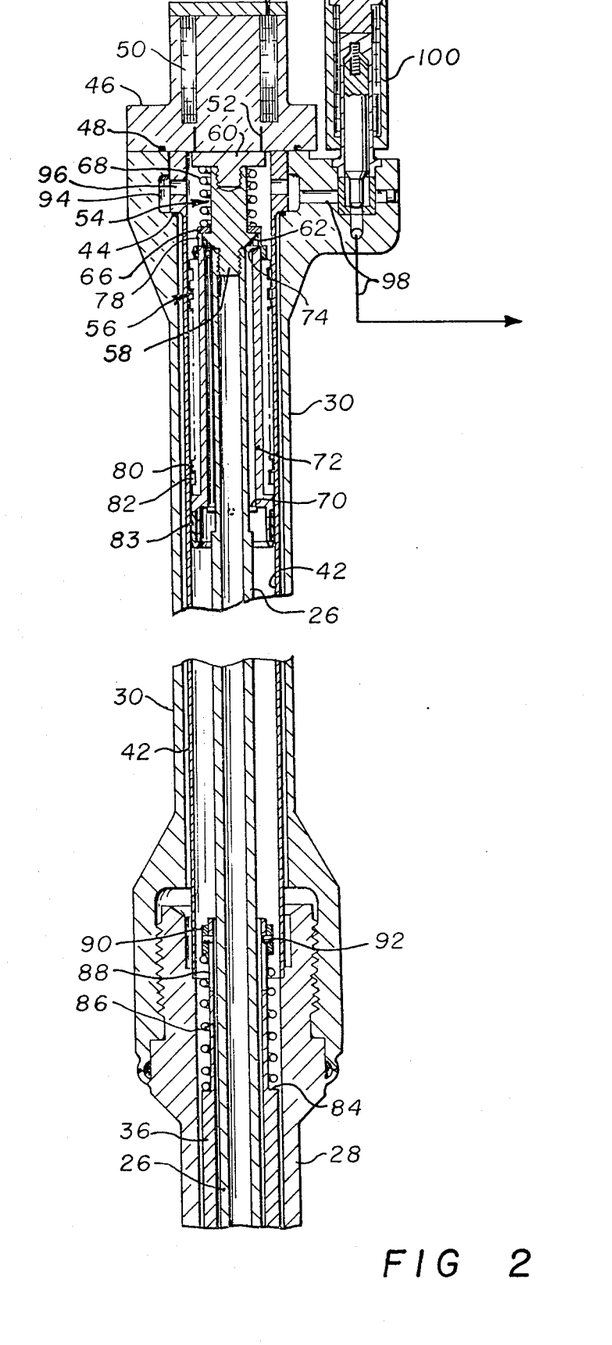
FIG. 2 is a side elevation view, partially in section, of one embodiment of the control rod actuator of the invention, showing the control rod extension is a raised and latched position.
Figure 2A:
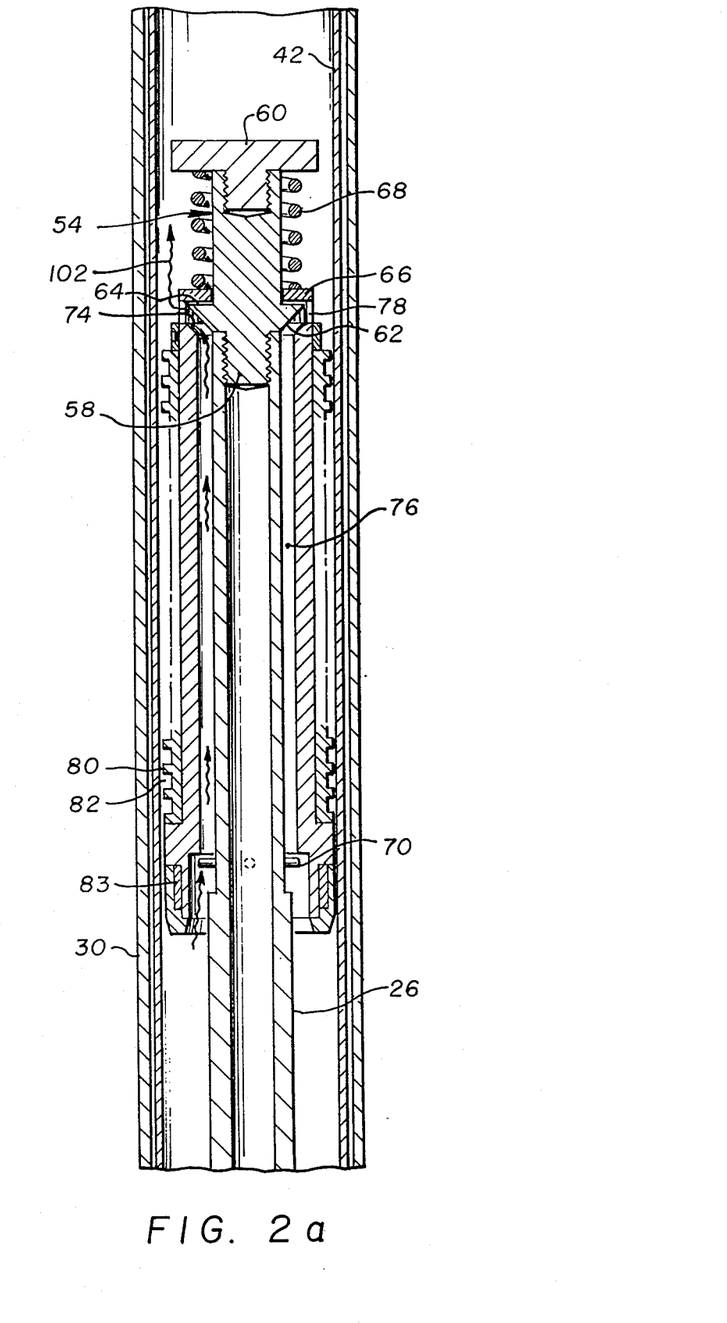
FIG. 2A is a drawing similar to FIG. 2 showing the piston and piston rod during insertion.
Figure 2B:
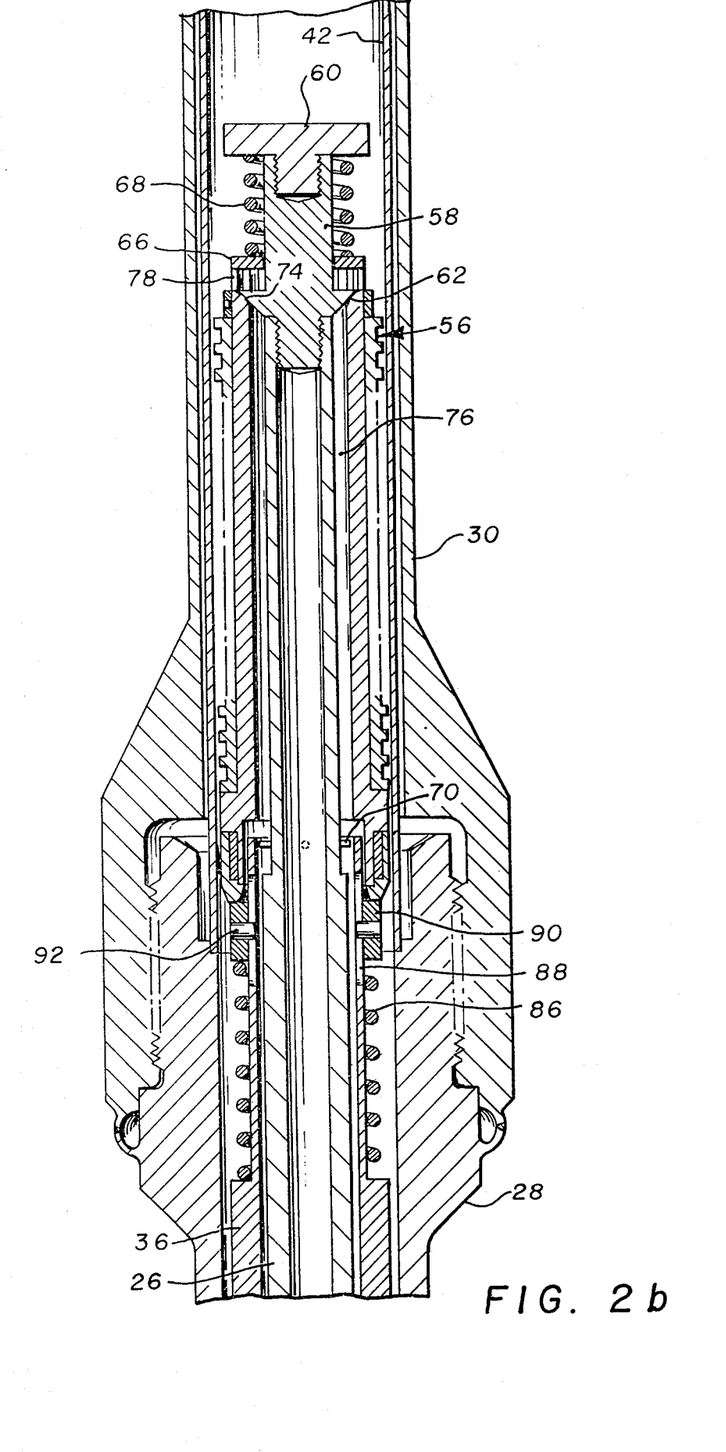
FIG. 2B is a further view of the embodiment depicted in FIGS. 2 and 2A and showing the piston and piston rod in a fully inserted position.

The actuator for control rod 22 is of the piston and cylinder type, one embodiment of which is seen in FIG. 2 and additionally FIGS. 2A and 2B. Referring to FIG. 2, hollow, substantially cylindrical nozzle 28 extends vertically through reactor vessel head 14 and is sealingly joined at its upper end, as by threaded and welded engagement, the lower end of a vertically extending, substantially cylindrical actuator housing 30. The inside diameter of actuator housing 30 is somewhat greater than the inside diameter of nozzle 28. A hollow cylindrical sleeve, open at both ends, extends vertically within actuator housing 30 substantially the full length thereof and is supported thereby and serves to define actuator cylinder 42. Actuator cylinder 42 has an inside diameter substantially the same as the inside diameter of nozzle 28 and has an outside diameter which is somewhat less than that of the inside diameter of actuator housing 30. Actuator cylinder 42 is radially enlarged near its upper end to form a downwardly facing shoulder. Actuator housing 30 is radially outwardly recessed at or near its upper end to receive the enlarged portion of actuator cylinder 42 and to define an upwardly facing shoulder for supporting the downwardly facing shoulder of cylinder 42. An annular seal 44 is positioned between the downwardly facing shoulder of actuator cylinder 42 and the upwardly facing shoulder of actuator housing 30 whereby to define an elongated annular void, closed at its upper end, between the cylinder and the actuator housing.

The inside diameter of nozzle 28 near its upper end is of sufficient width to receive and stabilize the lower end of the actuator cylinder 42. Actuator housing 30 and actuator cylinder 42 (and nozzle 28) are preferably of the same material, such as non-magnetic stainless steel, in order to have substantially the same coefficient of thermal expansion. Cylinder 42 may include one or more ports extending through its wall at or closely adjacent the lower end thereof to permit fluid communication between the interior of reactor vessel 10 and the elongated annular void between cylinder 42 and housing 30.

The upper end surfaces of actuator cylinder 42 and actuator housing 30 are in substantially the same plane and an upper end closure member 46, preferably of stainless steel, is removably secured to the upper end of actuator housing 30, to close the end of the housing and cylinder 42. An annular seal 48 is positioned between end closure 46 and actuator housing 30 to fluidly isolate the interior of cylinder 42 from the atmosphere or outside environment. Further, a cylindrical electromagnetic coil 50 having a vertical axis coaxial with that of actuator cylinder 42 is mounted on or in end closure 46. The lower end of coil 50 is spaced approximately 1 inch above the lower face of end closure 46. Additionally, an annular slot extends upwardly into the undersurface of enclosure 46 and is substantially coaxial with coil 50 and has a diameter substantially that of the inside diameter of coil 50. The function of coil 50 and slot 52 will be described below.

According to the invention, extension shaft or rod 26 serves as a piston rod by which a force applied to a piston is transmitted to the neutron absorber elements 24 to be moved within core 18. Core 18 may have a vertical dimension of 12 to 15 feet, thus requiring a stroke length for the neutron absorbers 24 and extension shaft 26 of some 12 to 15 feet. Additionally the absorber elements 24 when fully raised are still several feet below the lower end of actuator cylinder 42. Therefore, extension rod 26 may have a length of about 20 feet. Extension rod 26 is preferably of non-magnetic stainless steel and may be of hollow tubular configuration. Extension rod 26 includes an enlarged head portion 54 at its upper end. Head portion 54 is securely joined to extension rod 26 and is diametrically larger than the outside diameter of the extension rod immediately therebelow. Head portion 54 provides a contact surface against which a movable piston 56 may transmit a force to extension rod 26.

According to the embodiment of the invention depicted in FIGS. 2, 2A and 2B, head portion 54 includes a lower plug-like member 58 threadedly inserted in the upper end of extension rod 26 in secure engagement therewith and an upper member 60 in turn threadedly engaged with the upper end of member 58. Head portion 54, or at least the bottom member 58 thereof, might be integrally formed with extension rod 26, particularly if the latter were a solid member. Head portion 54 is circular in cross section along its length. Member 58 includes a lower portion for engagement with extension rod 26, and intermediate portion of greater diameter than the lower portion and an upper portion of less diameter than the intermediate portion. The diameter of the intermediate portion of member 58 is somewhat greater than the outside diameter of extension rod 26 immediately therebelow. Between the lower and intermediate portions of member 58 there is preferably a downwardly facing truncated conical surface 62. Surface 62 may serve to connect or span the different diameters and may be conveniently at an angle of about 45 degrees to the horizontal. The transition between the intermediate portion of member 58 and the upper portion thereof preferably provides a horizontal upwardly facing surface 64. Further, member 60 has a diameter somewhat larger than that of the upper portion of member 58 to define a downwardly facing surface in spaced opposition to surface 64. Head portion 54, or at least member 60 thereof, is of a magnetic material for interaction with electromagnetic coil 50.

An annular disc or washer 66 slidably encircles the upper portion of member 58. Washer 66 has an inside diameter which is less than and an outside diameter which is slightly greater than that of the intermediate portion of member 58. A coil spring 68 is interposed, in compression, between the upper surface of washer 66 and the downwardly facing surface of head portion member 60, to provide a downward relative bias to the washer.

In this embodiment extension rod 26 has a constant outside diameter over most of its length, but is of reduced outside diameter along the uppermost foot or more of its length. Along this region of rod 26 having the reduced diameter, there are located one or more radially extending, finger-like stops 70. Stops 70 are relatively few in number and of small area to avoid impeding flow. Stops 70 extend radially outward to a diameter which is substantially the same as that of the remainder of extension rod 26.

According to the invention, a piston 56 is provided which is movable longitudinally of the extension rod 26. Piston 56 freely, slidably encircles extension rod 26 above stops 70. Piston 56 is of generally hollow cylindrical configuration, open at both ends, and may include a sleeve 72 about its outside diameter along a portion of its length. The outside diameter of the piston 56, including sleeve 72, is only slightly less than that of the inside diameter of the actuator cylinder 42, there being a typical radial clearance of about 0.020 inch. The inside diameter of piston 56 varies along its length. The bottom portion of piston 56 has an inside diameter that is somewhat greater than the outside diameter of the upper end of piston stop support tube 36. The intermediate portion of piston 56 has an inside diameter which is somewhat less than the diameter of stop 70 and less than the outside diameter of downwardly facing conical surface 62 of head portion 54. The upper portion of piston 56 has an inside diameter which is slightly greater than the greatest diameter of member 58 of head portion 54. The transition between the intermediate and upper portion of the piston 56 is preferably provided by an upwardly facing, truncated, conical surface, 74, disposed at 45° to the horizontal for close mating and flow restricting or sealing engagement with downwardly facing conical surface 62 when moved into contact therewith. One or the other of surfaces 62 and 74 might have a convex geometry to provide line contact with the other surface. The inside diameter of the intermediate portion of piston 56 is sufficiently great that there exists a substantial radial clearance between it and the outside diameter of extension rod 26 thereat. This radial clearance might typically be about 0.20 inch, approximately 10 times that between the outer diameter of piston 56 and actuator cylinder 42. The outside diameter of piston 56 may typically approach 2.75 inches with the outside diameter of the extension rod 26 in the region of the piston being about 1.25 inch. This geometry creates a vertically extending, elongated, annular passage 76 between extension rod 26 and piston 56. The inner diameter of the lower portion of piston 56 is correspondingly greater than the outer diameter of extension rod 26 at its greatest diameter in order to approximately maintain and continue the cross-sectional area of passage 76 therealong. Further, the extent of longitudinal freedom of piston 56 relative to extension rod 26 between stop 70 and sealing surface 62 is sufficiently great that the piston, in its relative downward position, creates an annular passage between sealing surfaces 74 and 62. This passage has substantially the same cross-sectional area as passage 76 and in effect, provides an upward continuation thereof.

A number of notches extend downwardly into and radially through piston 56 about its circumference at its upper end to form ports 78. Ports 78 are of sufficient vertical and lateral extent and of sufficient number to provide a cross-sectional area to flow which is substantially the same as that of passage 76. Ports 78 extend not only through the wall of piston 56 to permit lateral flow, but also are open upwardly, allowing a vertical component to the flow of fluid through the ports. The remaining upper end surface of piston 56 which is not removed to create ports 78 serve as a bearing and force transmitting surface for engagement with the under surface of washer 66.

Piston 56 includes a sleeve 72 about its outer circumference along at least a portion of its length. Sleeve 72 is in snug engagement with piston 56 and includes a plurality of circumferential land and places, 80 and 82 respectively, around the outside thereof along its length. The successive convergence and divergence of fluid flow between actuator cylinder 42 and the land and places of sleeve 72 increases the flow resistance of piston 56 relative to that of a smooth surface piston. Sleeve 72 may be held axially in place by some form of removable locking collar or the like. Similarly, an annular magnet 83 may be affixed to piston 56. Magnet 83 may serve to actuate position indicating, reed-type, limit switches, not shown.

Piston stop support tube 36 may be supported at its lower end by support member 20 and is coaxial with and has an inside diameter somewhat greater than stop 70 and the inside diameter of extension rod 26. Piston stop tube 36 has an outside diameter along most of its length which is somewhat less than the inside diameter of nozzle 28 to create an annular flow passage therebetween. Tube 36 has a reduced outside diameter along the upper 5 to 10 inches of its length, creating a seating surface 84 for buffer spring 86. Longitudinally extending guide slots 88 exist in stop tube 36 along a portion of the reduced diameter section thereof. A buffer sleeve 90 closely, slidingly surrounds the reduced diameter portion of tube 36 and may be about 1 inch in length. Pins 92 extend from buffer sleeve 90 inwardly into guide slots 88 to limit the upward and downward extent of travel of the sleeve. Buffer spring 86 is positioned in compression between spring seat 84 and the downward facing surface of buffer sleeve 90, serving to provide an upward bias to sleeve 90.

The circular recess in the upper end of actuator housing 30 which provides a supporting seat for actuator cylinder 42 is of sufficient diameter to create an annular manifold 94 around the actuator cylinder 42 at or near the upper end thereof. A plurality of fluid ports 96 extends radially through actuator cylinder 42 closely adjacent the upper end thereof in communication with manifold 94. A fluid conduit 98 extends from manifold 94, to the intake side of pump 38. A normally cylinder solenoid actuated, control valve 100 is positioned in conduit 98 near manifold 94 and may conveniently be supported by and/or housed in actuator housing 30.

Referring now to the operation of the novel control rod actuator of the invention as depicted in FIGS. 2, 2A and 2B, it will become evident that a reduced or limited fluid flow will be sufficient to positively and effectively raise piston 56, and accordingly extension rod 26 and neutron absorbers 24, while insuring a minimum of fluid resistance during a scram or rapid insertion of the control rod. In FIG. 2 control rod 22 is shown in the fully withdrawn condition and the magnetic member 60 of head portion 54 is magnetically held against the undersurface of upper enclosure 46 by means of electromagnet 50 which is energized during the rod withdrawal operation and remains energized so long as the control rod is to be retained in the withdrawn position. Slot 52 in the underside of closure 46 improves the efficiency of electromagnet 50.

With rod 22 fully withdrawn from core 18, control valve 100 will normally be in the de-energized state to close conduit 98 and prevent any flow of the water in actuator cylinder 42, the fluid pressures on both ends of piston 56 are equal, and spring 68 acts to move washer 66, and accordingly piston 56, downward to some limit position. Washer 66 is limited by surface 64. Downward travel of piston 56 relative to extension rod 26 is limited by piston stops 70. Passage 76 is open the full length of piston 56, including between surfaces 74 and 62 and through ports 78. Piston 56 will remain in this configuration until rapid insertion of the control rod is required, as during a scram.

When rapid insertion of control rod 22 is required, it is only necessary to de-energize electromagnetic coils 50, thereby eliminating the latching force which maintained the control rod withdrawn. Control valve 100 will remain in the closed state, normally preventing longitudinal coolant flow within and relative to actuator cylinder 42. Once the magnetic latching force is removed, control rod 22 which may weigh as much as 400 pounds begins to descend relative to the actuator cylinder. The flow path created by passage 76 is continuous between the piston 56 and extension rod 26 and permits relatively resistance free flow displacement of the fluid relatively upward past the piston as indicated by arrows 102. This low resistance to flow is needed to permit rapid descent of the control rod 22 and its associated piston 56. The greater the minimum cross sectional area of passage 76, the greater the reduction of flow resistance and accordingly, the more rapid the descent permitted. For this reason it is important that washer 66 not extend any further beyond the major diameter of head portion member 58 than is necessary to engage part of piston 56 and that the piston be capable of moving downward relative to extension rod 26 a sufficient distance to expose or create a large cross-sectional area between the sealing surfaces 62 and 74. Though there may be a small upward force developed on piston 56 during its descent spring 68 is of sufficient strength, for instance as high as 200 pounds, to maintain the piston in the relatively downward position and maintain passage 76 open.

When control rod 22 is nearly fully inserted and still rapidly descending, the lower face of piston 56 will contact the upper face of buffer sleeve 90. The weight and momentum of control rod 22 will move buffer sleeve 90 downwardly against the force of spring 86 to a fully inserted position for the control rod. This position is depicted in FIG. 2B. During insertion it will be remembered that control valve 100 has remained closed, preventing any flow within actuator cyliner 42 relative thereto. However, due to the weight of control rod 22 which is significantly greater than that of the biasing force of washer hold-down spring 68, piston 56 will be forced upward relative to extension rod 26 such that its sealing surface 64 sealingly contacts sealing surface 62 of the extension rod when the rod is at rest in the inserted position. Control rod 22 and piston 56 will remain in the fully inserted position so long as control valve 100 remains closed.

When it is desired to withdraw the control rod 22 from core 18, control valve 100 is opened to permit the pressure differential which exists between the lower end of actuator cylinder 42 and the intake to pump 38 to be impressed across the actuator cylinder and accordingly, across piston 56. An upward flow of coolant within actuator cylinder 42 is re-established and the lifting force applied to piston 56, and accordingly to the control rod 22, will depend upon the pressure drop developed across the piston itself. The upward force applied to piston 56 is a function of the pressure drop developed thereacross, which is in turn a function of flow resistance across the piston. Because fluid passage 76 is now closed by contact between sealing surfaces 62 and 74, as depicted in FIG. 2B, relatively little coolant will bypass the piston and instead an upward force will be developed thereon which is sufficient to maintain the flow passage closed and to lift control rod 22 from the fully inserted to the fully withdrawn position. Upon reaching the fully withdrawn position, coils 50 are once again energized to latch the control rod in the withdrawn position and the control valve 100 is then closed, eliminating the lifting force on the piston and allowing spring 68 to reopen passage 76 and ports 78 prior to any subsequent scram.

Figure 3:
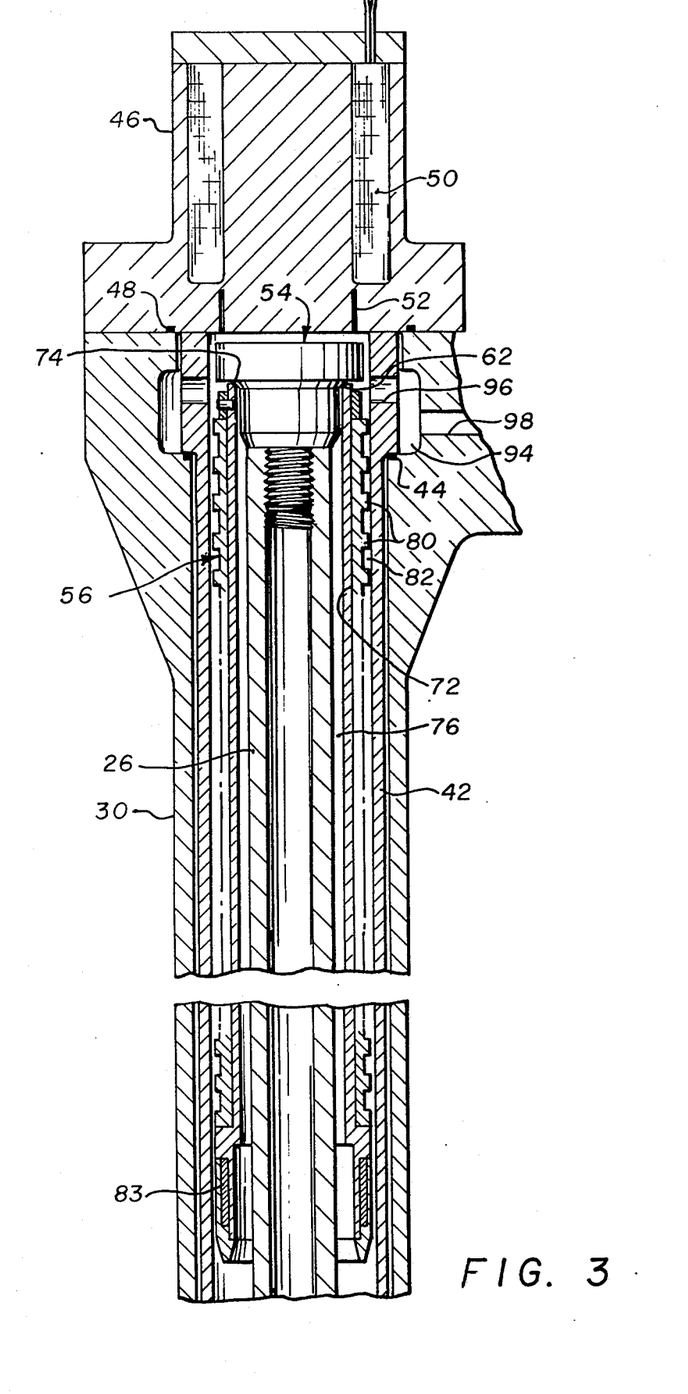
FIG. 3 is a side elevation view, partially in section, of another embodiment of the control rod actuator wherein the piston is capable of longitudinal movement relative to the piston rod over substantially the full length of the piston rod.

Reference is now made to the embodiment depicted in FIG. 3 in which it will be seen that piston 56' is free to move relative to extension rod 26' over substantially the full vertical extent thereof within actuator cylinder 42. Piston 56' may be of substantially constant inside diameter over most of its length except for the lowermost portion which must be outwardly recessed to pass over the upper end of piston stop support tube 36 to contact upper sleeve 90. Unlike the embodiment of FIG. 2, piston 56' need not be of greater inside diameter than head portion 54' near its upper end because there is no washer for the piston to contact and the upwardly facing sealing surface 74' may be formed on the upper face of the piston. Correspondingly, head portion 54' which will be formed of some magnetic material, such as magnetic stainless steel, need not include the upper member 60 nor spring 68 nor washer 66. Additionally, a downwardly facing truncated conical surface 62' is machined in the underside of head portion 54' to be in registry with the upwardly facing sealing surface 74' of the piston. Surface 74' might be convex to provide line contact with surface 62'. In this embodiment, the piston stops 70 of FIG. 2 do not exist and extension rod 26 may be of uniform diameter throughout its length.

In all other respects the control rod actuator arrangement of the FIG. 3 embodiment is identical to that of the FIG. 2 embodiment. However, now piston 56' will be permitted to descend the full length of actuator cylinder 42 when control rod 22 is fully withdrawn and latched and control valve 100 is closed. Depending on the spacing between the outer diameter of extension rod 26' and the inside diameter of piston 56', the piston may descend in free fall at varying speeds, however the speed is at least that of control rod 22 alone during free fall. Piston 56' will initially come to rest on buffer sleeve 90 and at some later time when a scram is initiated, the sealing surface 62' of head portion of 54' will rapidly descend to contact with sealing surface of 74' of piston 56'. As in the FIG. 2B embodiment, piston 56' will then be in sealing and force transmitting engagement with extension rod 26', preparatory to opening control valve 100 to develop a lifting force on the piston. The piston and control rod are similarly raised when the control valve is opened.

The piston of FIG. 2 is somewhat more complex than that of FIG. 3; however, the presence of spring 68 enhances the opening of a flow passage between the piston and the extension rod and there is less chance of the "captive" piston 56 binding with the wall of cylinder 42 during a scram than for the "free" piston 56' during its free fall.

It will be appreciated that a supplemental bypass flow path might be provided to further enhance the speed with which extension rod 26, and possibly piston 56, descend during a scram operation. Such a by-pass might comprise a fluid circuit connected at one end with the annular passage between actuator housing 30 and actuator cylinder 42 and connected at the other end to the segment of conduit 98 between the manifold 94 and control valve 100. It would then be desirable that the control valve, such as 100, have the capability of blocking this by-pass path when cylinder 42 is connected through conduit 98 to pump 38, but connecting the by-pass path with the cylinder when the normal lifting flow through the cylinder and conduit 98 is terminated.

It will be further appreciated that one or more check valves acting to selectively open and close fluid passages through the body of the piston itself would also provide a means for permitting fluid to bypass the piston in order to facilitate rapid insertion of the control rod.

It will be understood that the embodiments shown and described herein are merely illustrative and that changes may be made without departing from the scope of the invention as claimed.

What is claimed is:

1. In a nuclear reactor including a reactor vessel and a neutron absorber for vertical reciprocation in said vessel, a neutron absorber actuator assembly comprising:
   a. a housing extending upward from said vessel and including an actuator cylinder extending vertically therewithin;
   b. a piston rod drivingly connected to said neutron absorber and extending thereabove and including a head portion near the upper end thereof and sized for free movement within said cylinder between raised and lowered positions;
   c. piston means freely encircling said piston rod below said head portion for longitudinal movement relative thereto and sized to engage the undersurface of said piston rod head portion and to have a larger diameter than said piston rod head portion for close sliding relation with the wall of said cylinder;
   d. a fluid source operatively connected to said actuating cylinder for selectively applying a net upward force to said piston to raise said piston and piston rod to said raised position; and
   e. means for latching said piston rod comprising a selectively energizable electromagnet means associated with said housing and a part of said piston rod made of magnetic material so positioned with respect to said electromagnet means as to megnetically latch said piston rod in said raised position.

2. The apparatus of claim 1 wherein said reactor vessel includes a cooling fluid under pressure; said housing and actuator cylinder open into said reactor vessel and said cooling fluid provides said fluid source for applying said force to said piston to raise said piston and piston rod.

3. The apparatus of claim 2 wherein said head portion of said piston rod is a magnetic material.

4. The apparatus of claim 1 wherein said piston rod head portion includes an annular substantially downward facing surface and said piston means includes a complementary substantially upward facing surface for substantially fluid tight contact therebetween when said piston means receives said upward force.

5. The apparatus of claim 4 wherein said piston means includes a plurality of circumferential land and places about its outside diameter for increasing fluid flow resistance between said piston and cylinder.

6. The apparatus of claim 4 wherein said piston rod and said piston means cooperate to limit the extent of said relative movement therebetween to a distance substantially less than that between said rod raised and lowered positions; and including means for biasing said piston means out of said fluid tight contact with said head portion when said upward force on said piston is less than required to raise said piston rod, whereby to open a fluid passage between said piston means and said piston rod.

7. The apparatus of claim 1 wherein said piston means includes a plurality of circumferential land and places about its outside diameter for increasing fluid flow resistance between said piston and cylinder.

8. The apparatus of claim 1 further including shock absorbing means positioned near the bottom of said cylinder for buffering the final descent of said piston means and said piston rod means.

9. In a nuclear reactor including a reactor vessel, a core in said vessel and a neutron absorber for vertical reciprocation in said vessel and core, a neutron absorber actuator assembly comprising:
a. a vertically extending actuator cylinder disposed above said core;
b. means for selectively establishing a predetermined upward flow of fluid through said cylinder;
c. fluid responsive drive means drivingly connected to said neutron absorber, disposed for reciprocation in said cylinder, and including a piston rod and a piston, said piston being vertically movable relative to said piston rod; and
d. means included in said drive means for opening and closing a flow path through said drive means which is responsive to an upward force applied thereto by said upward flow to close said flow path and is responsive to removal of the upward force of said predetermined upward flow to open said flow path, which means includes complementary sealing surfaces on said piston and piston rod, said sealing surfaces being brought into path-closing contact with each other by relative movement of said piston and piston rod.

* * * * *